United States Patent
Ohashi (10) Patent No.: US 11,003,408 B2
(45) Date of Patent: May 11, 2021

(54) IMAGE GENERATING APPARATUS AND IMAGE GENERATING METHOD

(71) Applicant: Sony Interactive Entertainment Inc., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/590,551

(22) Filed: Oct. 2, 2019

(65) Prior Publication Data

US 2020/0125312 A1 Apr. 23, 2020

(30) Foreign Application Priority Data

Oct. 18, 2018 (JP) .............................. JP2018-196942

(51) Int. Cl.
| G06F 3/14 | (2006.01) |
| G09G 3/00 | (2006.01) |
| G06T 11/60 | (2006.01) |
| G06F 3/01 | (2006.01) |

(52) U.S. Cl.
CPC ............... *G06F 3/14* (2013.01); *G06F 3/013* (2013.01); *G06T 11/60* (2013.01); *G09G 3/001* (2013.01)

(58) Field of Classification Search
CPC ............ G06F 3/14; G06F 3/013; G06T 11/60; G09G 3/001
See application file for complete search history.

(56) References Cited

U.S. PATENT DOCUMENTS

| 2008/0267523 A1* | 10/2008 | Shimoyama ............. H04N 9/75 382/254 |
| 2018/0268512 A1* | 9/2018 | Pronovost ................. G06T 1/20 |
| 2020/0043223 A1* | 2/2020 | Leiby .................... G06T 19/006 |

* cited by examiner

*Primary Examiner* — Haixia Du
(74) *Attorney, Agent, or Firm* — Katten Muchin Rosenman LLP (57) ABSTRACT

An image generating apparatus includes: a rendering unit that carries out rendering of objects of a virtual space and generates a computer graphics image; a drawing processing unit that executes subsequent drawing processing for the computer graphics image; and an interrupt unit that interrupts the rendering at a timing of a graphics processor interrupt and causes execution of the subsequent drawing processing based on a result of the rendering to the timing of the graphics processor interrupt. The drawing processing unit includes a reprojection unit that executes reprojection processing of converting the computer graphics image in conformity to a new position of a point of view or a new direction of a line of sight as the subsequent drawing processing. The interrupt unit causes execution of the reprojection processing of the computer graphics image, based on the result of the rendering to the timing of the graphics processor interrupt.

9 Claims, 7 Drawing Sheets

FIG. 8

# IMAGE GENERATING APPARATUS AND IMAGE GENERATING METHOD

BACKGROUND

This disclosure relates to apparatus and method for generating an image.

Mounting a head-mounted display connected to a game machine on a head and playing a game through operation of a controller or the like while viewing a screen displayed on the head-mounted display have been carried out. When the head-mounted display is mounted, there is an effect that a sense of immersion in a video world is enhanced and the entertainment property of the game is further enhanced because the user views nothing other than the video displayed on the head-mounted display. Furthermore, if video of virtual reality (VR) is displayed on the head-mounted display and an omnidirectional virtual space in which a 360-degree view can be seen when the user who wears the head-mounted display rotates the head is allowed to be displayed, the sense of immersion in the video is further enhanced and the operability of the application of a game or the like is also improved.

Furthermore, although a user who wears a non-transmissive head-mounted display becomes incapable of directly seeing the external world, there is also a head-mounted display of a video-transmissive (video see-through) type that can photograph video of the external world by a camera mounted on the head-mounted display and display the video on a display panel. In the video see-through type head-mounted display, it is also possible to generate and display video of augmented reality (AR) by superimposing objects of a virtual world generated based on computer graphics (CGs) on the video of the external world photographed by the camera. Differently from the virtual reality separated from the real world, the video of the augmented reality is what is obtained through augmentation of the real world by the virtual objects, and the user can experience the virtual world while being aware of a connection with the real world.

SUMMARY

Due to advancement of the graphics processor, an environment in which rendering processing about which calculation takes a long time like ray tracing can be executed in real time is being made. However, although depending on the quality of computer graphics, it is still difficult to implement the real-time ray tracing at a sufficient frame rate. In particular, to display video of virtual reality or augmented reality with the head-mounted display, it is required to carry out drawing at 120 frame/seconds (fps) or higher. However, the user gets motion sick if a long time is taken for the rendering processing and the frame rate lowers and the state in which the frame rate is not stable occurs. Even with a constant frame rate, the video looks blurred at a low frame rate such as 60 fps because of characteristics of the human eye.

Furthermore, in the case of displaying video of augmented reality on the head-mounted display, video of the external world is captured at a high frame rate in the camera mounted on the head-mounted display in association with the motion of the head of the user, whereas the frame rate of the virtual world is low compared with the camera because a long time is taken for rendering of the superimposed virtual world. For this reason, it is impossible to generate the video of augmented reality in conformity to the high frame rate of the camera, and the user feels a subtle delay in the video of augmented reality and loses the sense of a connection with the real world. Moreover, the post-process executed on the video of augmented reality is also carried out at the frequency of the rendering and thus the quality of the video lowers.

The present disclosure is made in view of such problems and it is desirable to provide image generating an apparatus and image generating method that can improve the visual quality of computer graphics.

According to an embodiment of the present disclosure, there is provided an image generating apparatus including a rendering unit that carries out rendering of objects of a virtual space and generates a computer graphics image, a drawing processing unit that executes subsequent drawing processing for the computer graphics image, and an interrupt unit that interrupts the rendering at a timing of a graphics processor interrupt and causes execution of the subsequent drawing processing based on a result of the rendering to the timing of the graphics processor interrupt. The drawing processing unit includes a reprojection unit that executes reprojection processing of converting the computer graphics image in conformity to a new position of the point of view or a new direction of the line of sight as the subsequent drawing processing. The interrupt unit causes execution of the reprojection processing of the computer graphics image, based on the result of the rendering to the timing of the graphics processor interrupt.

According to another embodiment of the present disclosure, there is provided an image generating method. This method includes a rendering step of rendering objects of a virtual space to generate a computer graphics image, a drawing processing step of executing subsequent drawing processing for the computer graphics image, and an interrupt step of interrupting the rendering at a timing of a graphics processor interrupt to cause execution of the subsequent drawing processing based on a result of the rendering to the timing of the graphics processor interrupt. The drawing processing step includes a reprojection step of executing reprojection processing of converting the computer graphics image in conformity to a new position of the point of view or a new direction of the line of sight as the subsequent drawing processing. The interrupt step causes execution of the reprojection processing of the computer graphics image, based on the result of the rendering to the timing of the graphics processor interrupt.

What are obtained by translating arbitrary combinations of the above constituent elements and expressions of the present disclosure among method, apparatus, system, computer program, data structure, recording medium, and so forth are also effective as aspects of the present disclosure.

According to an embodiment of the present disclosure, the visual quality of computer graphics can be improved.

DETAILED DESCRIPTION OF PREFERRED EMBODIMENTS

Figure 1:
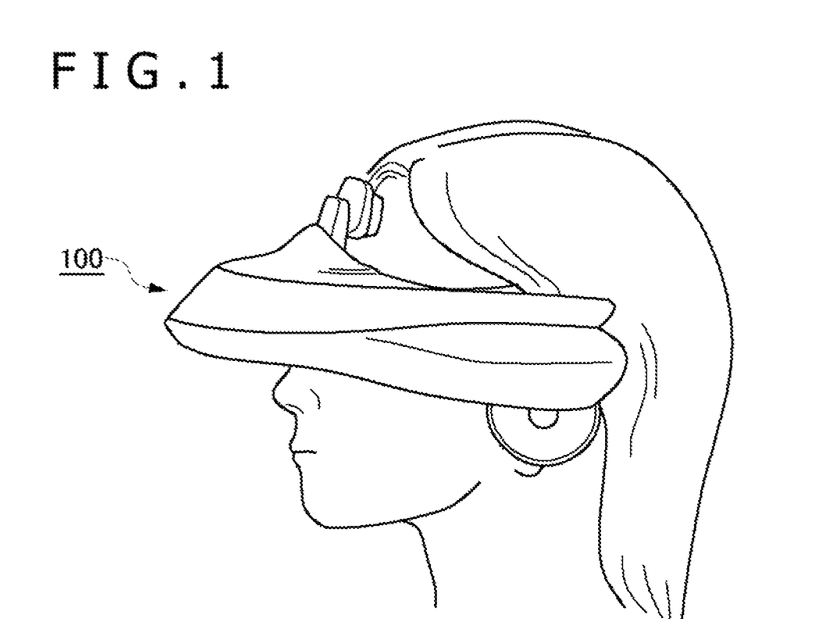
FIG. 1 is an appearance diagram of a head-mounted display.

FIG. 1 is an appearance diagram of a head-mounted display 100. The head-mounted display 100 is a display apparatus for being mounted on the head of a user to allow the user to view a still image, moving image, or the like displayed on a display and listen to sound, music, or the like output from a headphone.

Position information of the head of the user who wears the head-mounted display 100 and orientation information such as the rotational angle and tilt of the head can be measured by gyro sensor, acceleration sensor, and so forth incorporated in or externally attached to the head-mounted display 100.

The head-mounted display 100 is equipped with a camera unit and the external world can be photographed while the user wears the head-mounted display 100.

The head-mounted display 100 is one example of a "wearable display." Here, a generating method of an image displayed on the head-mounted display 100 will be described. However, the image generating method of the present embodiment is not limited to the head-mounted display 100 in a narrow sense and can also be applied to the case in which a user wears eyeglasses, eyeglasses-type display, eyeglasses-type camera, headphone, headset (headphone equipped with a microphone), earphone, earring, ear-hook camera, headwear, headwear equipped with a camera, hair band, or the like.

Figure 2:
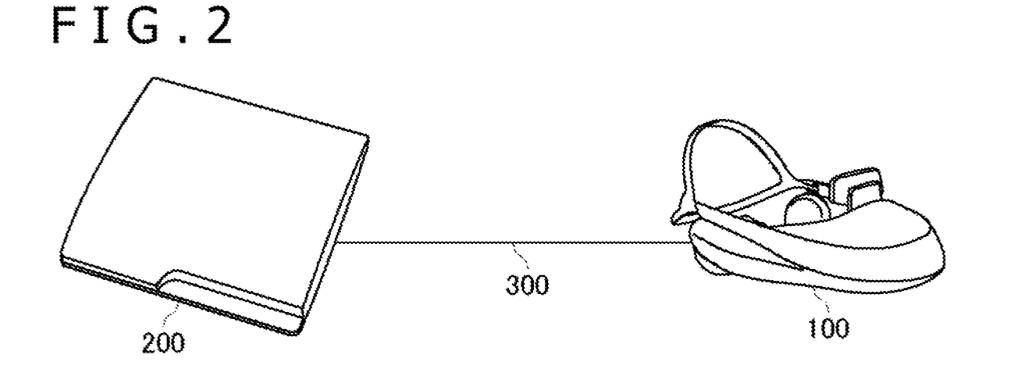
FIG. 2 is a configuration diagram of an image generating system according to an embodiment of the present disclosure.

FIG. 2 is a configuration diagram of an image generating system according to the present embodiment. As one example, the head-mounted display 100 is connected to an image generating apparatus 200 by an interface 300 of the high-definition multimedia interface (HDMI) (registered trademark), which is a standard specification of a communication interface to transmit video and sound by a digital signal, or the like.

The image generating apparatus 200 predicts position-orientation information of the head-mounted display 100 in consideration of delay from generation of video to display thereof from the present position-orientation information of the head-mounted display 100 and draws the image to be displayed on the head-mounted display 100 on the premise of the predicted position-orientation information of the head-mounted display 100 to transmit the image to the head-mounted display 100.

One example of the image generating apparatus 200 is a game machine. The image generating apparatus 200 may be further connected to a server through a network. In this case, the server may provide an online application such as a game in which plural users can participate through the network to the image generating apparatus 200. The head-mounted display 100 may be connected to a computer or portable terminal instead of the image generating apparatus 200.

Figure 3:
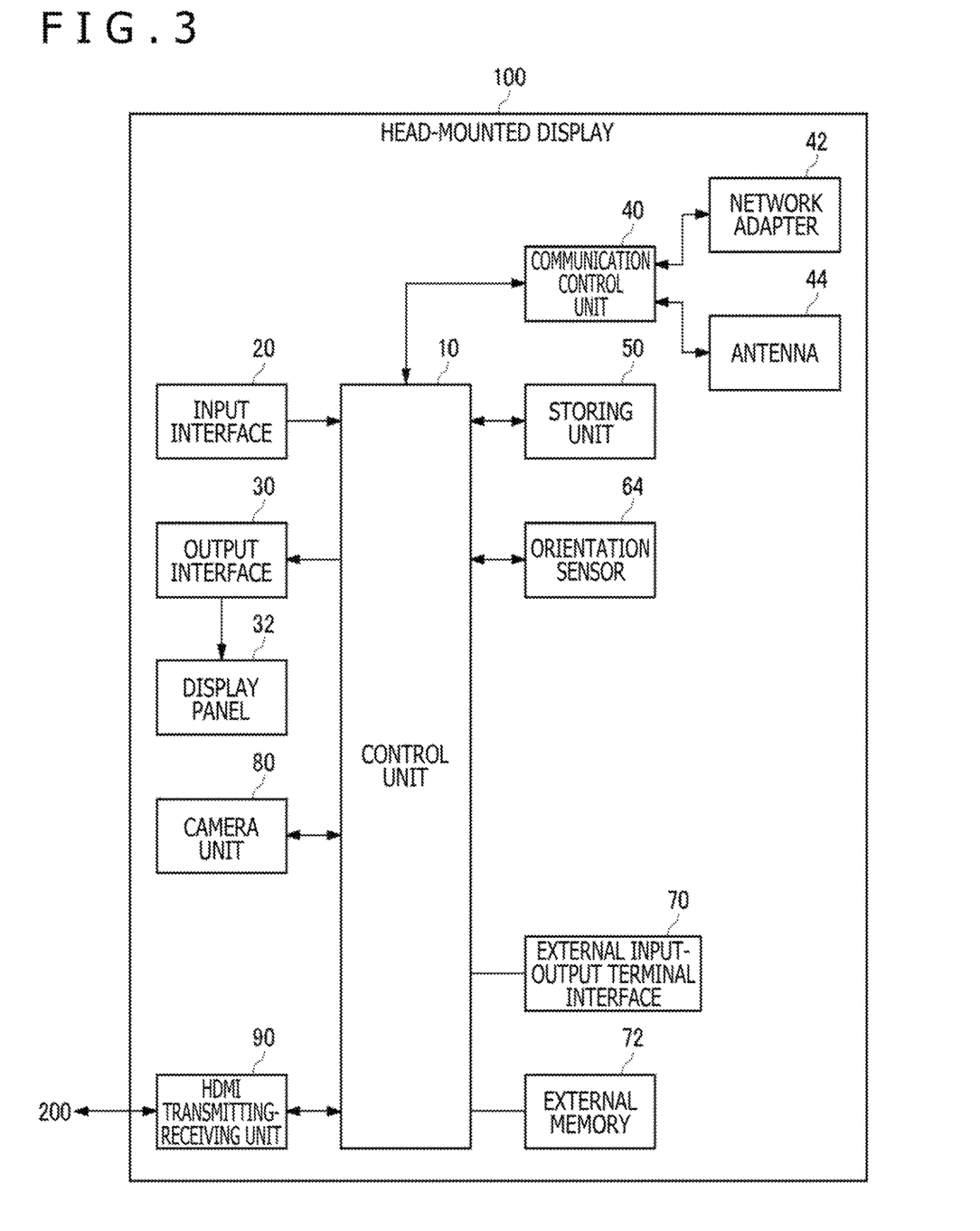
FIG. 3 is a functional configuration diagram of the head-mounted display.

FIG. 3 is a functional configuration diagram of the head-mounted display 100.

A control unit 10 is a main processor that processes and outputs signals such as image signal and sensor signal and instructions and data. An input interface 20 accepts operation signal and setting signal from a user and supplies them to the control unit 10. An output interface 30 receives the image signal from the control unit 10 and displays an image on a display panel 32.

A communication control unit 40 transmits data input from the control unit 10 to the external through a network adapter 42 or an antenna 44 by wired or wireless communication. Furthermore, the communication control unit 40 receives data from the external and outputs the data to the control unit 10 through the network adapter 42 or the antenna 44 by wired or wireless communication.

A storing unit 50 temporarily stores data, parameters, operation signal, and so forth processed by the control unit 10.

An orientation sensor 64 detects position information of the head-mounted display 100 and orientation information such as the rotational angle and tilt of the head-mounted display 100. The orientation sensor 64 is implemented by appropriately combining gyro sensor, acceleration sensor, angular acceleration sensor, and so forth. The forward-rearward, rightward-leftward, upward-downward motion of the head of the user may be detected by using a motion sensor obtained by combining at least one of three-axis geomagnetic sensor, three-axis acceleration sensor, and three-axis gyro (angular velocity) sensor.

An external input-output terminal interface 70 is an interface for coupling peripheral equipment such as a universal serial bus (USB) controller. An external memory 72 is an external memory such as a flash memory.

A camera unit 80 includes configurations for photographing, such as lens, image sensor, and ranging sensor, and supplies video and depth information of the photographed external world to the control unit 10. The control unit 10 controls focus, zoom, and so forth of the camera unit 80.

An HDMI transmitting-receiving unit 90 transmits and receives a digital signal of video and sound to and from the image generating apparatus 200 in accordance with the HDMI. The HDMI transmitting-receiving unit 90 receives the video and depth information of the external world photographed by the camera unit 80 from the control unit 10 and transmits them to the image generating apparatus 200 by an HDMI transmission path. The HDMI transmitting-receiving unit 90 receives an image generated by the image generating apparatus 200 from the image generating apparatus 200 by the HDMI transmission path and supplies the image to the control unit 10.

The control unit 10 can supply an image or text data to the output interface 30 to cause the display panel 32 to display it, and supply it to the communication control unit 40 to cause the communication control unit 40 to transmit it to the external.

The present position-orientation information of the head-mounted display 100 detected by the orientation sensor 64 is notified to the image generating apparatus 200 through the communication control unit 40 or the external input-output terminal interface 70. Alternatively, the HDMI transmitting-receiving unit 90 may transmit the present position-orientation information of the head-mounted display 100 to the image generating apparatus 200.

Figure 4:
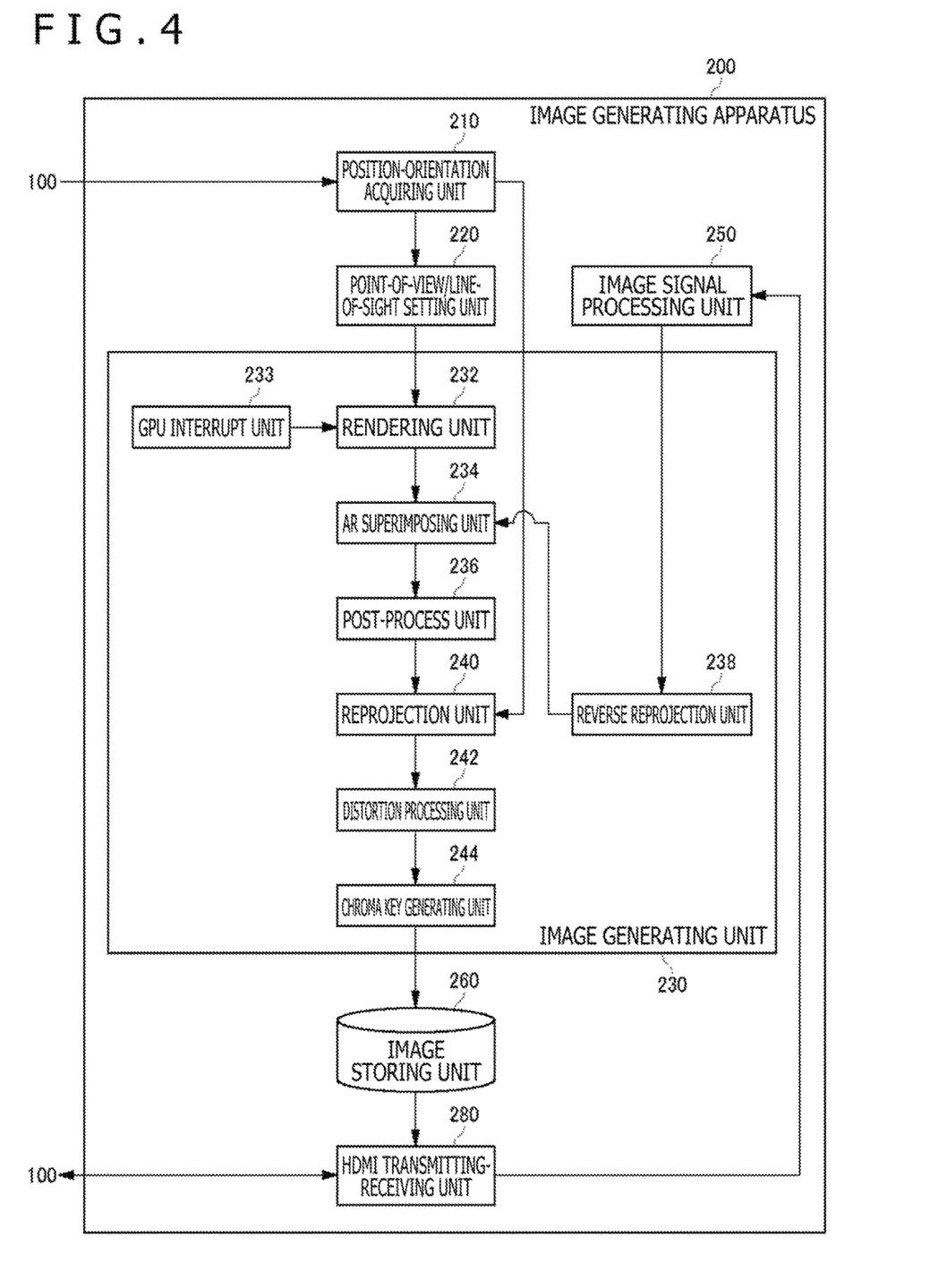
FIG. 4 is a functional configuration diagram of an image generating apparatus according to the embodiment.

FIG. 4 is a functional configuration diagram of the image generating apparatus 200 according to the present embodiment. This diagram depicts a block diagram in which attention is paid to functions and these functional blocks can be implemented in various forms by hardware, software, or a combination of them.

At least part of the functions of the image generating apparatus 200 may be implemented in the head-mounted display 100. Alternatively, at least part of the functions of the image generating apparatus 200 may be implemented in a server connected to the image generating apparatus 200 through a network.

A position-orientation acquiring unit 210 acquires the present position-orientation information of the head-mounted display 100 from the head-mounted display 100.

A point-of-view/line-of-sight setting unit 220 sets the position of the point of view and the direction of the line of sight of a user by using the position-orientation information of the head-mounted display 100 acquired by the position-orientation acquiring unit 210.

An HDMI transmitting-receiving unit 280 receives video of a real space photographed by the camera unit 80 from the head-mounted display 100 and supplies the video to an image signal processing unit 250.

The image signal processing unit 250 executes image signal processing (ISP) such as RGB conversion (demosaic processing), white balance, color correction, and noise reduction for a Raw image photographed by the camera unit 80 of the head-mounted display 100, and executes distortion correction processing of removing distortion and so forth due to the optical system of the camera unit 80. The image signal processing unit 250 supplies an RGB image for which the image signal processing and the distortion correction processing have been executed to an image generating unit 230.

The image generating unit 230 generates an augmented reality image by reading out data for generation of computer graphics from an image storing unit 260 and rendering objects of a virtual space to generate a CG image and superimposing the CG image on a camera image of a real space provided from the image signal processing unit 250, and outputs the augmented reality image to the image storing unit 260.

The image generating unit 230 includes a rendering unit 232, a GPU interrupt unit 233, an AR superimposing unit 234, a post-process unit 236, a reverse reprojection unit 238, a reprojection unit 240, and a distortion processing unit 242. Each kind of processing by the AR superimposing unit 234, the post-process unit 236, the reverse reprojection unit 238, the reprojection unit 240, and the distortion processing unit 242 is one example of subsequent drawing processing executed when a GPU interrupt occurs.

The rendering unit 232 carries out rendering of objects of a virtual space that are visible in the direction of the line of sight from the position of the point of view of the user who wears the head-mounted display 100 in accordance with the position of the point of view and the direction of the line of sight of the user set by the point-of-view/line-of-sight setting unit 220, and gives the objects to the AR superimposing unit 234.

The GPU interrupt unit 233 generates a GPU interrupt several milliseconds prior to Vsync and interrupts the rendering processing by the rendering unit 232 at the timing of the GPU interrupt. When the GPU interrupt occurs, the rendering unit 232 gives the result of rendering to the timing of the GPU interrupt to the AR superimposing unit 234.

In the case of superimposing a camera image photographed with the position of the point of view and the direction of the line of sight at a newer timing on a CG image rendered on the premise of the position of the point of view and the direction of the line of sight at a past timing, reverse reprojection processing may be executed for the camera image in order to cause the position of the point of view and the direction of the line of sight to match the past CG image.

The reverse reprojection unit 238 executes reverse reprojection processing of returning the camera image supplied from the image signal processing unit 250 to an image viewed from the past position of the point of view and the past direction of the line of sight, and gives the image to the AR superimposing unit 234.

The AR superimposing unit 234 generates an augmented reality image by superimposing the CG image with the past position of the point of view and the past direction of the line of sight generated by the timing of the GPU interrupt by the rendering unit 232 on the camera image resulting from the reverse reprojection, and gives the augmented reality image to the post-process unit 236.

The post-process unit 236 executes a post-process such as adjustment of the depth of field, tone mapping, and anti-aliasing for the augmented reality image and executes post-processing in such a manner that the augmented reality image obtained by superimposing the virtual objects on the image of the real space looks natural and smooth.

The reprojection unit 240 receives the latest position-orientation information of the head-mounted display 100 from the position-orientation acquiring unit 210 and executes reprojection processing for the augmented reality image for which the post-process has been carried out to convert the image to an image viewed from the latest position of the point of view and the latest direction of the line of sight of the head-mounted display 100.

Here, a description will be made about the reprojection. In the case of allowing the head-mounted display 100 to have a head-tracking function and generating video of virtual reality with change in the point of view and the direction of the line of sight in association with the motion of the head of the user, delay exists from the generation of the video of virtual reality to display thereof. Thus, a deviation occurs between the direction of the head of the user employed as the premise at the time of video generation and the direction of the head of the user at the timing when the video is displayed on the head-mounted display 100 and the user falls into a sick-like feeling (called VR sickness (virtual reality sickness) or the like) in some cases.

As above, a long time is taken from detection of the motion of the head-mounted display 100, issuing of a drawing command from the CPU, and execution of rendering by the graphics processing unit (GPU) until a drawn image is output to the head-mounted display 100. Suppose that the drawing is carried out at a frame rate of 60 frame/seconds (fps) for example and delay corresponding to one frame occurs from detection of the motion of the head-mounted display 100 to output of the image. This is about 16.67 milliseconds under the frame rate of 60 fps and is a sufficient time for the human to perceive the deviation.

Thus, processing called "time warp" or "reprojection" is executed and the rendered image is corrected in conformity to the latest position and orientation of the head-mounted display 100 to cause the human to perceive the deviation less readily.

The distortion processing unit 242 executes processing of distorting an image in conformity to distortion that occurs in the optical system of the head-mounted display 100 for the augmented reality image for which the reprojection processing has been executed, and stores the resulting image in the image storing unit 260.

A chroma key generating unit 244 generates a chroma key image from a CG image based on the depth information of a camera image. Specifically, the chroma key generating unit 244 determines the positional relationship between objects of a real space and objects of a virtual space and generates a chroma key image obtained by painting out, with specific one color (for example red), the background of the virtual objects and part of the objects of the real space existing on the front side relative to the virtual objects in the CG image. The chroma key image is used in order to superimpose the CG image on the camera image to generate an augmented reality image. The chroma key image is generated by using the camera image that has a low resolution and involves delay on the side of the image generating apparatus 200 and the CG image is superimposed on the camera image with low delay and high resolution based on the chroma key image on the side of the head-mounted display 100. Thereby, the augmented reality image without unnaturalness can be generated.

The HDMI transmitting-receiving unit 280 reads out frame data of the augmented reality image generated by the image generating unit 230 from the image storing unit 260 and transmits the frame data to the head-mounted display 100 in accordance with the HDMI.

A premise technique of the present embodiment will be described with reference to FIG. 5 and FIG. 6 and thereafter an improved technique of the present embodiment will be described with reference to FIG. 7 and FIG. 8.

Figure 5:
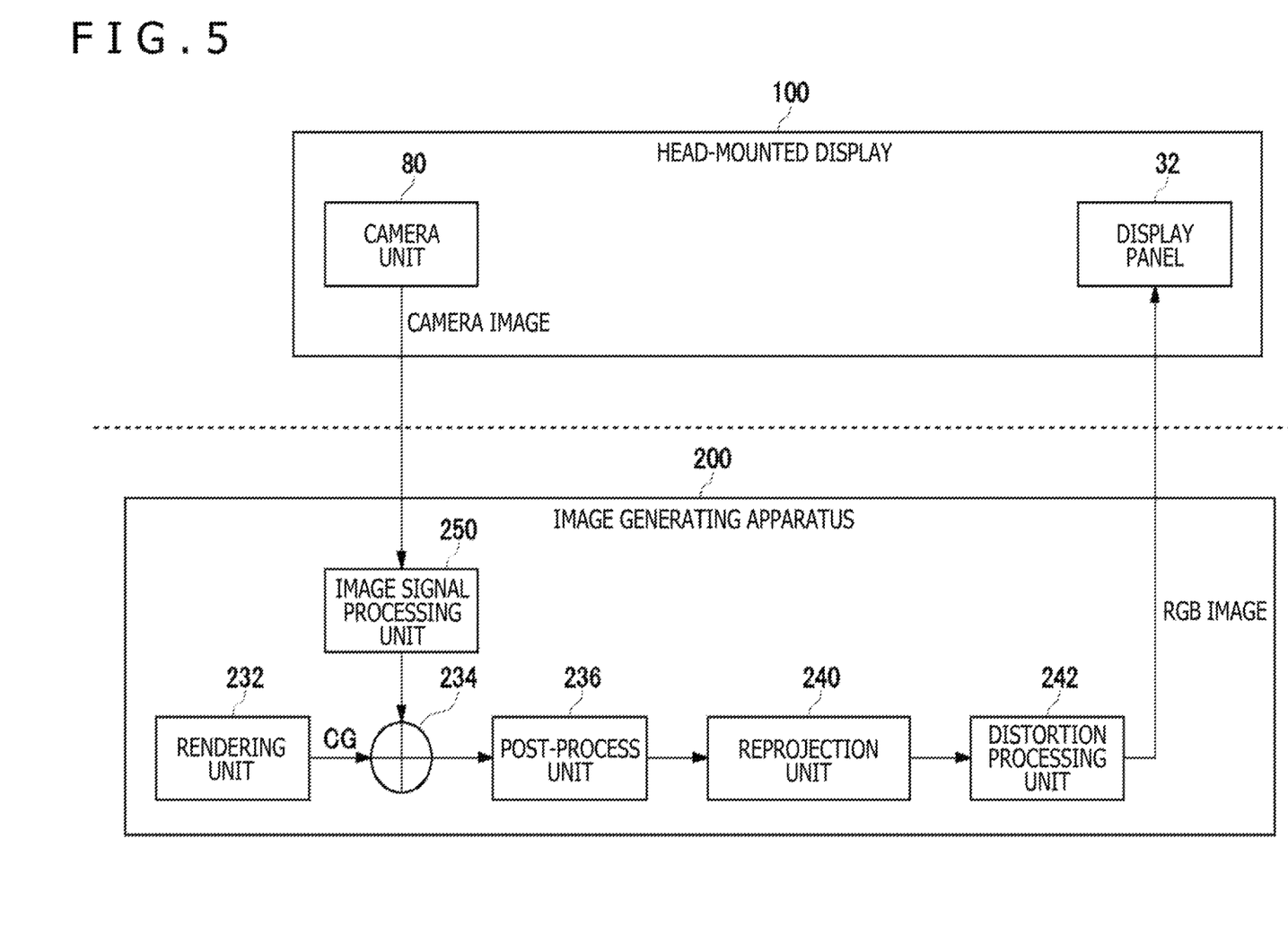
FIG. 5 is a diagram explaining the configuration of an image generating system as a premise for superimposing a CG image on a camera image to generate an augmented reality image.

FIG. 5 is a diagram explaining the configuration of an image generating system as a premise for superimposing a CG image on a camera image to generate an augmented reality image. Here, for simplification of the description, the main configuration of the head-mounted display 100 and the image generating apparatus 200 for generating an augmented reality image are diagrammatically represented and will be described.

A camera image of the external world photographed by the camera unit 80 of the head-mounted display 100 is transmitted to the image generating apparatus 200 and is supplied to the image signal processing unit 250. The image signal processing unit 250 executes image signal processing and distortion correction processing for the camera image and gives the resulting image to the AR superimposing unit 234.

The rendering unit 232 of the image generating apparatus 200 generates virtual objects viewed from the position of the point of view and the direction of the line of sight of the user who wears the head-mounted display 100 and gives the virtual objects to the AR superimposing unit 234.

The AR superimposing unit 234 superimposes a CG image on the camera image to generate an augmented reality image. The post-process unit 236 executes the post-process for the augmented reality image. The reprojection unit 240 converts the augmented reality image for which the post-process has been executed in conformity to the latest position of the point of view and the latest direction of the line of sight. The distortion processing unit 242 executes distortion processing for the augmented reality image after the reprojection. The final RGB image after the distortion processing is transmitted to the head-mounted display 100 and is displayed on the display panel 32.

Figure 6:
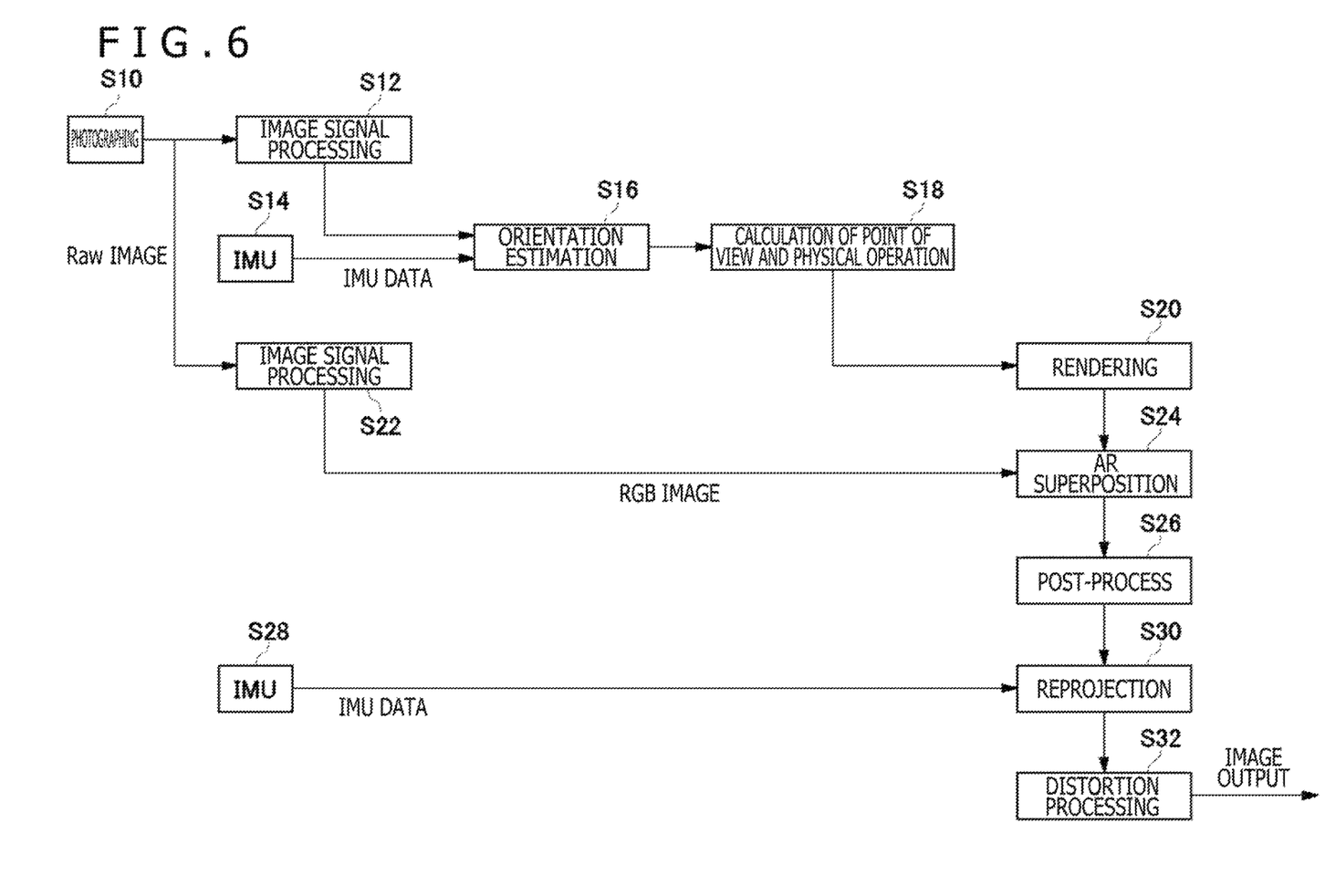
FIG. 6 is a diagram explaining the procedure of the generation of the augmented reality image by the image generating system of FIG. 5.

FIG. 6 is a diagram explaining the procedure of the generation of the augmented reality image by the image generating system of FIG. 5.

The camera unit 80 of the head-mounted display 100 photographs the external world and outputs a Raw image (S10). The image signal processing unit 250 executes the image signal processing and the distortion correction processing for the Raw image photographed by the camera unit 80 to generate a camera image for being used for simultaneous localization and mapping (SLAM) (S12). From an inertial measurement unit (IMU) such as the orientation sensor 64 of the head-mounted display 100, IMU data showing the present orientation information of the head-mounted display 100 is acquired (S14). SLAM processing in which self-position estimation and environment map creation are simultaneously carried out is executed by using the camera image and the IMU data and the orientation of the user who wears the head-mounted display 100 is estimated (S16).

Processing for update of computer graphics, such as calculation of the point of view and physical operation of the virtual objects, is executed based on the orientation estimation data (S18). The rendering unit 232 carries out rendering of objects of a virtual space and generates a CG image (S20).

Here, it should be noted that, in the rendering, the amount of processing increases according to the number of objects displayed in the virtual space and therefore a considerable time is taken for the processing when the number of objects is large.

The image signal processing unit 250 executes the image signal processing and the distortion correction processing for the Raw image photographed by the camera unit 80 to generate the camera image for providing see-through video to the head-mounted display 100 (S22).

The AR superimposing unit 234 generates an augmented realty image by superimposing the CG image on the camera image (S24). The post-process unit 236 executes the post-process for the augmented realty image (S26).

Here, it should be noted that the post-process is processing for the whole image and thus can be executed in a shorter time compared with the rendering irrespective of the number of virtual objects.

IMU data showing the latest orientation information of the head-mounted display 100 is acquired from the inertial measurement unit (S28). The reprojection unit 240 converts the augmented reality image in conformity to the latest orientation information of the head-mounted display 100 (S30). The distortion processing unit 242 executes lens distortion processing for the augmented reality image after the reprojection and outputs the augmented reality image for which the lens distortion processing has been executed (S32).

In the case of the configuration and processing procedure of the image generating system described with FIG. 5 and FIG. 6, the camera image is superimposed in conformity to the frame rate of the rendering. Because the processing time is long in the rendering, the frame rate of the rendering of a virtual space by the rendering unit 232 is lower compared with the frame rate of the photographing of the real space by the camera unit 80. For example, although photographing at 120 fps is carried out by the camera unit 80, drawing can be carried out at 60 fps in the rendering in some cases. For this reason, the frame rate of see-through video displayed on the display panel of the head-mounted display 100 lowers in conformity to the frame rate of the rendering and the see-through video becomes intermittent. As a result, a sense of reality is absent even when the user views video of augmented reality.

Thus, in the present embodiment, smooth video in conformity to the frame rate of the camera unit 80 is generated by interrupting rendering at the timing of a GPU interrupt and superimposing a camera image on the basis of the result of the rendering to the timing of the GPU interrupt and executing the post-process.

Figure 7:
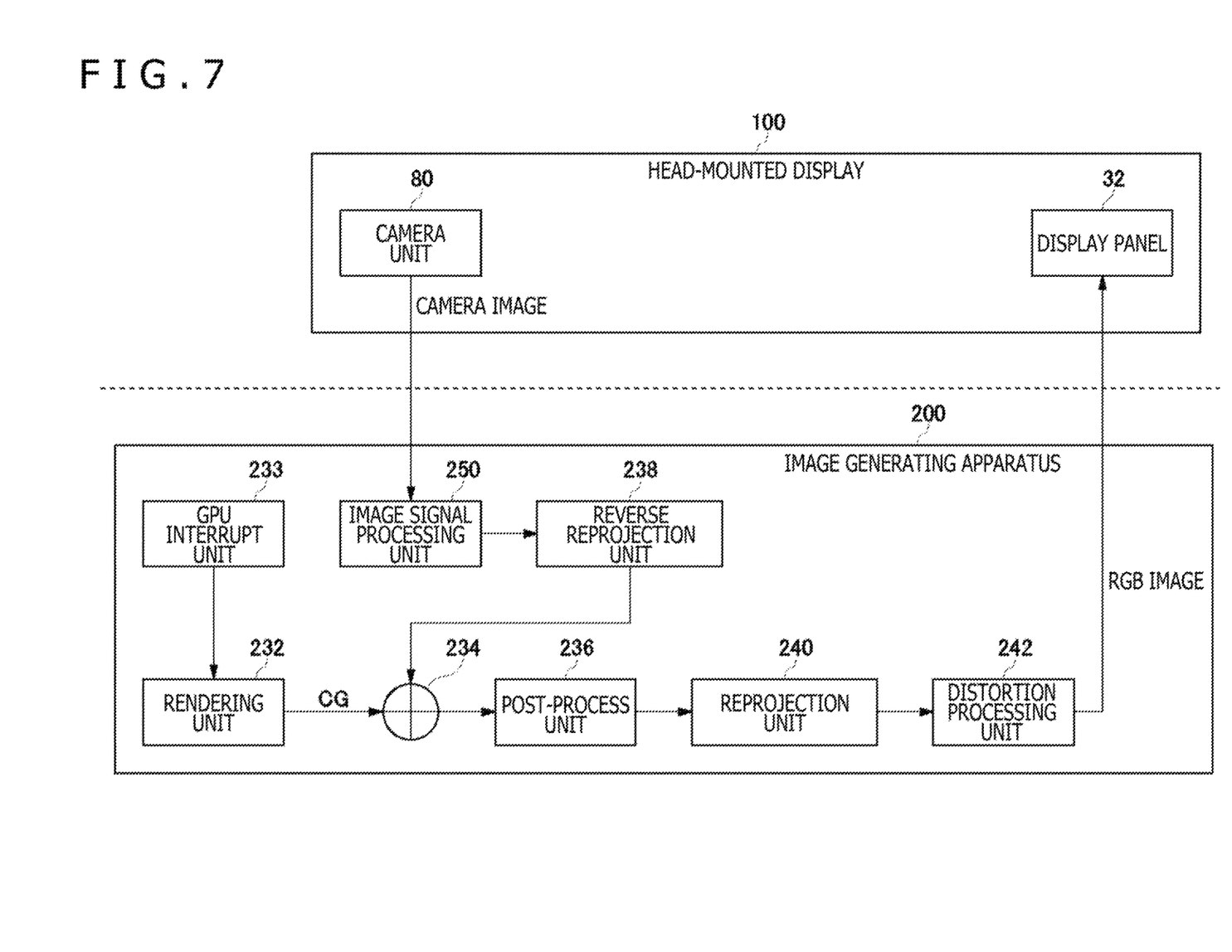
FIG. 7 is a diagram explaining the configuration of the image generating system according to the embodiment for superimposing a CG image on a camera image to generate an augmented reality image.

FIG. 7 is a diagram explaining the configuration of the image generating system according to the present embodiment for superimposing a CG image on a camera image to generate an augmented reality image. Description overlapping with the description of the premise technique of FIG. 5 is appropriately omitted and a configuration improved from the premise technique will be described.

The GPU interrupt unit 233 carries out setting in such a manner that a GPU interrupt occurs two milliseconds prior to Vsync for example. The GPU interrupt unit 233 interrupts rendering processing by the rendering unit 232 at the timing of the GPU interrupt and, based on the result of the rendering to the timing of the GPU interrupt, causes execution of each kind of processing subsequent thereto, i.e. superposition of a camera image by the AR superimposing unit 234, the post-process by the post-process unit 236, reprojection processing by the reprojection unit 240, and distortion processing by the distortion processing unit 242.

The reverse reprojection unit 238 executes reverse reprojection processing for the camera image for which image signal processing and distortion correction processing have been executed by the image signal processing unit 250 and converts the image to an image viewed from the past position of the point of view and the past direction of the line of sight of the head-mounted display 100 to give the image to the AR superimposing unit 234.

The AR superimposing unit 234 combines the camera image for which the reverse reprojection has been executed by the reverse reprojection unit 238 with the CG image of the result of the rendering to the timing of the GPU interrupt by the rendering unit 232. The post-process unit 236 executes the post-process for an augmented reality image obtained by the combining by the AR superimposing unit 234. The processing subsequent thereto is the same as the premise technique of FIG. 5.

Figure 8:
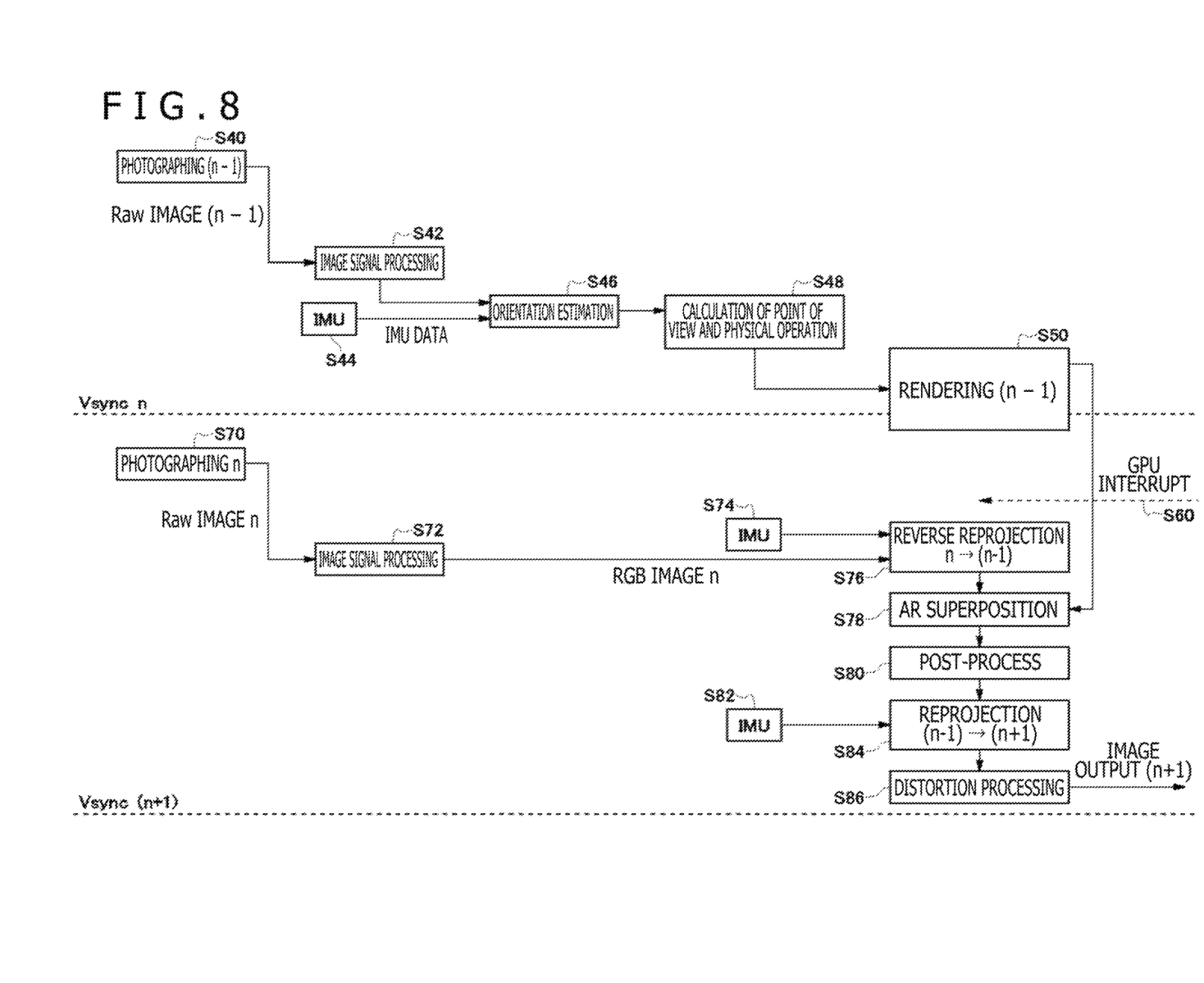
FIG. 8 is a diagram explaining the procedure of the generation of the augmented reality image by the image generating system of FIG. 7.

FIG. 8 is a diagram explaining the procedure of the generation of the augmented reality image by the image generating system of FIG. 7.

The camera unit 80 of the head-mounted display 100 photographs the external world and outputs an (n−1)-th Raw image (S40).

Processing of the following steps S42 to S48 is executed by the timing of n-th Vsync. However, rendering processing of a step S50 generally takes a long time and therefore has not been completed by the timing of n-th Vsync.

The image signal processing unit 250 executes the image signal processing and the distortion correction processing for the (n−1)-th Raw image photographed by the camera unit 80 and generates the camera image for being used for SLAM (S42). IMU data showing the present orientation information of the head-mounted display 100 is acquired from the inertial measurement unit (S44). SLAM processing is executed by using the camera image and the IMU data and the orientation of the user who wears the head-mounted display 100 is estimated (S46).

Processing for update of computer graphics, such as calculation of the point of view and physical operation of virtual objects, is executed based on the orientation estimation data (S48). The rendering unit 232 carries out rendering of objects of a virtual space and generates an (n−1)-th CG image (S50). However, the generation is not completed by the timing of n-th Vsync and the rendering is interrupted by a GPU interrupt (S60). The rendering unit 232 transfers the result of the rendering to the timing of the GPU interrupt to the AR superimposing unit 234.

Next, at the timing of n-th Vsync, the camera unit 80 of the head-mounted display 100 photographs the external world and outputs an n-th Raw image (S70).

Processing of the following steps S72 to S86 is executed by the timing of (n+1)-th Vsync.

The image signal processing unit 250 executes the image signal processing and the distortion correction processing for the n-th Raw image photographed by the camera unit 80 to generate an n-th camera image for providing see-through video to the head-mounted display 100 (S72).

IMU data showing the latest orientation information of the head-mounted display 100 is acquired from the inertial measurement unit (S74). The reverse reprojection unit 238 converts the n-th camera image to an (n−1)-th camera image viewed from the position of the point of view and the direction of the line of sight of the previous frame, based on the latest IMU data (S76).

The AR superimposing unit 234 generates an (n−1)-th augmented reality image by superimposing the (n−1)-th CG image obtained by the rendering to the timing of the CPU interrupt in the step S50 on the (n−1)-th camera image obtained by the reverse reprojection (S78). The post-process unit 236 executes the post-process for the (n−1)-th augmented reality image (S80).

IMU data showing the latest orientation information of the head-mounted display 100 is acquired from the inertial measurement unit (S82). The reprojection unit 240 predicts the position of the point of view and the direction of the line of sight of the frame after next based on the latest orientation information of the head-mounted display 100 and converts the (n−1)-th augmented reality image to an (n+1)-th augmented reality image (S84). Because delay corresponding to two frames occurs due to the rendering, the frame after next is predicted and the reprojection is carried out.

The distortion processing unit 242 executes the lens distortion processing for the (n+1)-th augmented reality image after the reprojection and outputs the (n+1)-th augmented reality image for which the lens distortion processing has been executed at the timing of (n+1)-th Vsync (S86).

Although diagrammatic representation is not made here, chroma key processing may be executed after the step S86 in the case of using chroma key synthesis in order to superimpose the CG image on the camera image. As described above, in this case, the chroma key generating unit 244 generates a chroma key image from the CG image based on the depth information of the camera image that has a low resolution and involves delay and the CG image is superimposed on the camera image with low delay and high resolution, based on the chroma key image on the side of the head-mounted display 100. Thereby, the augmented reality image with low delay and high quality can be generated.

As above, even when rendering takes a long time, the augmented reality image is generated and displayed at the frame rate of the camera without synchronizing with the rendering processing by interrupting the rendering by the GPU interrupt that occurs in synchronization with Vsync without waiting for the completion of the rendering and executing the superposition of the camera image and the CG image, the post-process of the augmented reality image, and so forth subsequent thereto.

The reverse reprojection is carried out in order to cause the timestamp of the point of view of three-dimensional graphics to match the timestamp of the camera image used at the time of the post-process, and IMU data acquired between the two timestamps is used in order to calculate the difference in the orientation applied in the reverse reprojection.

The IMU data is typically acquired from the inertial measurement unit and the orientation can be predicted by using all pieces of IMU data of the section for the reprojection. The acquisition cycle of the IMU data is equal to or shorter than one millisecond and is shorter than the interval of Vsync. In the section in which the IMU data is insufficient, linear interpolation may be carried out corresponding to the prediction time.

As another embodiment, rendering may be interrupted at the timing of a GPU interrupt and partial rendering in which rendering of partial objects of a virtual space is carried out may be executed. The partial rendering is also one example of the subsequent drawing processing executed when the GPU interrupt occurs. For example, graphics processing that may take a long time for calculation like ray tracing is executed by basic rendering. When a GPU interrupt occurs, the basic rendering is interrupted and the partial rendering is executed. In the partial rendering, rendering of partial objects such as moving objects in a virtual space is carried out for example.

The basic rendering draws static objects with high accuracy by ray tracing. Thus, drawing at a high frame rate is difficult and drawing can be carried out at 30 fps for example. On the other hand, the partial rendering draws dynamic objects. Therefore, the frame rate may be raised and drawing is carried out at 60 fps for example. The superposition of a camera image and a CG image, the post-program, the reprojection, the distortion processing, and so forth may be executed at a high frame rate in conjunction with the motion of the head of the user who wears the head-mounted display and are executed at 120 fps for example.

The degree of priority may be set regarding the GPU interrupt in order to execute different kinds of drawing processing at different frame rates. In the basic rendering, rendering is executed by normal processing with the lowest degree of priority. The partial rendering is executed in such a manner that a GPU interrupt is generated once per two times of Vsync six milliseconds prior to Vsync for example to interrupt the basic rendering. The post-process and the reprojection are executed in such a manner that a GPU interrupt is generated every Vsync two milliseconds prior to Vsync to interrupt the basic rendering. The post-process and the reprojection are interrupt processing with the highest degree of priority and the partial rendering is interrupt processing with the middle degree of priority. The basic rendering is executed with the lowest degree of priority.

A difference occurs in the clock time as the premise of drawing among the basic rendering, the partial rendering, and the reprojection and therefore the point of view according to the time difference may be converted. In the case of carrying out the partial rendering, the result of the partial rendering is superimposed after a time warp of the point of view of the basic rendering is carried out to the point of view at the time of the start of the partial rendering. In the reprojection, a time warp is carried out from the point of view of the partial rendering to the point of view at the timing of panel output. As another method of the conversion of the point of view according to the time difference, the partial rendering may be carried out with the point of view of the basic rendering and a time warp may be carried out to the point of view at the timing of panel output in the reprojection of the post-process.

When the result of the partial rendering is reflected in the basic rendering, the following point may be considered.

Polygon mesh data used in the partial rendering is used also at the time of the basic rendering. However, when data of the mesh at which a ray is first reflected in ray tracing from the point of view of a camera is the mesh data used in the partial rendering, the ray is caused to travel straight without being reflected (however, the mesh data is used as it is in the case of second or subsequent reflection). As a result, although the mesh itself used in the partial rendering is not drawn, the other objects are affected. That is, expression of the shadow also becomes possible although the shadow looks slightly delayed. In the basic rendering, as well as ray tracing, an arbitrary technique in which, based on mesh data of the objects as the drawing targets in the partial rendering, these objects themselves are not drawn and rendering of the influence of light on the other objects is carried out may be used.

The timing when the result of the basic rendering is used is the timing of a frame after several frames. Therefore, data of the orientation obtained by anticipating the frame after several frames is used as the mesh data of the partial rendering.

As described above, according to the image generating apparatus 200 of the present embodiment, rendering can be interrupted at the timing of a GPU interrupt and the post-process can be executed for an image generated by this timing and the resulting image can be output. Because the image can be output at the timing of the GPU interrupt asynchronously with the rendering without waiting for the completion of the rendering, video output at a stable high frame rate becomes possible. This can prevent the user from getting sick. In addition, by setting the frame rate high, causing the user to feel as if the resolution is high apparently is also enabled even when the resolution of the display panel is low.

Furthermore, according to the image generating apparatus 200 of the present embodiment, a smooth and natural augmented reality image can be generated because rendering can be interrupted at the timing of a GPU interrupt and the post-process can be executed at a high frame rate. This can offer augmented reality experience with smooth motion to the user without depending on the application load that fluctuates.

Moreover, according to the image generating apparatus 200 of the present embodiment, by interrupting the basic rendering at the timing of a GPU interrupt and executing the partial rendering, dynamic objects can be drawn at a high frame rate while static objects are drawn with high accuracy by ray tracing or the like.

In the above-described embodiments, the case of rendering an augmented reality image obtained by superimposing a CG image on a camera image is described. However, am embodiment of the present disclosure can be applied, as well as to the augmented reality image, to overall rendering of the CG image and can output video at a stable high frame rate.

The above-described embodiments are not limited to tracking of the head-mounted display and provide the effect also when being applied to the case in which the angle of a virtual camera generally used for rendering changes.

The present disclosure is described above based on the embodiments. The embodiments are exemplification and it is understood by those skilled in the art that various modification examples are possible in the combinations of the respective constituent elements and the respective processing processes of them and such modification examples also exist in the range of the present disclosure.

The present disclosure contains subject matter related to that disclosed in Japanese Priority Patent Application JP 2018-196942 filed in the Japan Patent Office on Oct. 18, 2018, the entire content of which is hereby incorporated by reference.

What is claimed is:

1. An image generating apparatus comprising:
a rendering unit that carries out rendering of objects of a virtual space and generates a computer graphics image;
a drawing processing unit that executes subsequent drawing processing for the computer graphics image; and
an interrupt unit that interrupts the rendering at a timing of a graphics processor interrupt and causes execution of the subsequent drawing processing based on a result of the rendering to the timing of the graphics processor interrupt, wherein
the drawing processing unit comprises:
a reprojection unit that executes reprojection processing of converting the computer graphics image in conformity to a new position of a point of view or a new direction of a line of sight as part of the subsequent drawing processing;
post-process unit that executes a first post-process for the computer graphics image as part of the subsequent drawing processing; and
a superimposing unit that superimposes the computer graphics image on a photographed image of a real space to generate an augmented reality image,
wherein the post-process unit executes a second post-process for the augmented reality image, and
wherein the interrupt unit causes execution of the superposition of the photographed image and the computer graphics image, the second post-process of the augmented reality image, and the reprojection processing of the augmented reality image for which the second post-process has been executed, based on the result of the rendering to the timing of the graphics processor interrupt.

2. The image generating apparatus according to claim 1, wherein
the drawing processing unit further executes partial rendering in which rendering of partial objects of the virtual space is carried out, and
the interrupt unit interrupts rendering by the rendering unit at the timing of the graphics processor interrupt and causes execution of the partial rendering based on the result of the rendering to the timing of the graphics processor interrupt.

3. The image generating apparatus according to claim 2, wherein
in the rendering by the rendering unit, based on mesh data of objects as drawing targets in the partial rendering, the objects are not drawn as the drawing targets in the partial rendering and rendering of influence of light on other objects is carried out.

4. The image generating apparatus according to claim 1, wherein the drawing processing unit further includes a chroma key generating unit that executes chroma key processing of the computer graphics image to generate a chroma key image,
wherein the chroma key image is used for being superimposed by the superimposing unit.

5. An image generating method comprising:
rendering objects of a virtual space to generate a computer graphics image;
drawing processing executing subsequent drawing processing for the computer graphics image; and
interrupting the rendering at a timing of a graphics processor interrupt to cause execution of the subsequent drawing processing based on a result of the rendering to the timing of the graphics processor interrupt,
wherein the subsequent drawing processing comprises reprojection processing of converting the computer graphics image in conformity to a new position of a point of view or a new direction of a line of sight,
wherein the interrupting causes execution of the reprojection processing of the computer graphics image, based on the result of the rendering to the timing of the graphics processor interrupt,
wherein, as against basic rendering executed by the rendering unit, partial rendering in which rendering of partial objects of the virtual space is carried out as a part of the subsequent drawing processing,
wherein the interrupting causes interruption of the basic rendering at the timing of the graphics processor interrupt and causes execution of the partial rendering based on the result of the rendering to the timing of the graphics processor interrupt, and
wherein in the basic rendering, based on mesh data of objects as drawing targets in the partial rendering, the objects are not drawn in the partial rendering and rendering of influence of light on other objects is carried out.

6. A non-transitory computer readable medium having stored thereon a program for a computer, the program comprising:
rendering objects of a virtual space to generate a computer graphics image;
drawing processing executing subsequent drawing processing for the computer graphics image; and
interrupting the rendering at a timing of a graphics processor interrupt to cause execution of the subsequent drawing processing based on a result of the rendering to the timing of the graphics processor interrupt, wherein
wherein the subsequent drawing processing comprises reprojection processing of converting the computer graphics image in conformity to a new position of a point of view or a new direction of a line of sight, and
wherein the interrupting causes execution of the reprojection processing of the computer graphics image based on the result of the rendering to the timing of the graphics processor interrupt,
wherein, as against basic rendering executed by the rendering unit, partial rendering in which rendering of partial objects of the virtual space is carried out as a part of the subsequent drawing processing,
wherein the interrupting causes interruption of the basic rendering at the timing of the graphics processor interrupt and causes execution of the partial rendering based on the result of the rendering to the timing of the graphics processor interrupt, and
wherein in the basic rendering, based on mesh data of objects as drawing targets in the partial rendering, the objects are not drawn in the partial rendering and rendering of influence of light on other objects is carried out.

7. An image generating apparatus comprising:
a rendering unit that carries out rendering of objects of a virtual space and generates a computer graphics image;
a drawing processing unit that executes subsequent drawing processing for the computer graphics image; and an interrupt unit that interrupts the rendering at a timing of a graphics processor interrupt and causes execution of the subsequent drawing processing based on a result of the rendering to the timing of the graphics processor interrupt, wherein the drawing processing unit includes a reprojection unit that executes reprojection processing of converting the computer graphics image in conformity to a new position of a point of view or a new direction of a line of sight as a part of the subsequent drawing processing, wherein the interrupt unit causes execution of the reprojection processing of the computer graphics image, based on the result of the rendering to the timing of the graphics processor interrupt;

wherein as against basic rendering executed by the rendering unit, the drawing processing unit executes partial rendering in which rendering of partial objects of the virtual space is carried out as the subsequent drawing processing, and wherein the interrupt unit interrupts the basic rendering at the timing of the graphics processor interrupt and causes execution of the partial rendering based on the result of the rendering to the timing of the graphics processor interrupt, and wherein in the basic rendering, based on mesh data of objects as drawing targets in the partial rendering, the objects are not drawn in the partial rendering drawn and rendering of influence of light on other objects is carried out.

8. An image generating method comprising:

rendering objects of a virtual space to generate a computer graphics image;

drawing processing executing subsequent drawing processing for the computer graphics image; and interrupting the rendering at a timing of a graphics processor interrupt to cause execution of the subsequent drawing processing based on a result of the rendering to the timing of the graphics processor interrupt, wherein the drawing processing includes reprojection executing reprojection processing of converting the computer graphics image in conformity to a new position of a point of view or a new direction of a line of sight as a part of the subsequent drawing processing, and wherein the interrupting causes execution of the reprojection processing of the computer graphics image, based on the result of the rendering to the timing of the graphics processor interrupt;

executing a first post-process for the computer graphics image as part of the subsequent drawing processing;

superimposing the computer graphics image on a photographed image of a real space to generate an augmented reality image; and executing a second post-process for the augmented reality image, wherein the interrupting causes execution of the superposition of the photographed image and the computer graphics image, the second post-process of the augmented reality image, and the reprojection processing of the augmented reality image for which the second post-process has been executed, based on the result of the rendering to the timing of the graphics processor interrupt.

9. A non-transitory computer readable medium having stored thereon a program for a computer, the program comprising:

rendering objects of a virtual space to generate a computer graphics image;

drawing processing executing subsequent drawing processing for the computer graphics image; and interrupting the rendering at a timing of a graphics processor interrupt to cause execution of the subsequent drawing processing based on a result of the rendering to the timing of the graphics processor interrupt, wherein the drawing processing includes reprojection executing reprojection processing of converting the computer graphics image in conformity to a new position of a point of view or a new direction of a line of sight as a part of the subsequent drawing processing, and wherein the interrupting causes execution of the reprojection processing of the computer graphics image, based on the result of the rendering to the timing of the graphics processor interrupt;

executing a first post-process for the computer graphics image as part of the subsequent drawing processing;

superimposing the computer graphics image on a photographed image of a real space to generate an augmented reality image; and executing a second post-process for the augmented reality image, wherein the interrupting causes execution of the superposition of the photographed image and the computer graphics image, the second post-process of the augmented reality image, and the reprojection processing of the augmented reality image for which the second post-process has been executed, based on the result of the rendering to the timing of the graphics processor interrupt.

* * * * *